United States Patent
Hasan et al.

(10) Patent No.: US 12,168,610 B2
(45) Date of Patent: Dec. 17, 2024

(54) SYSTEM AND METHOD FOR PERMANENT CARBON DIOXIDE SEQUESTRATION USING A RENEWABLE ENERGY SOURCE

(71) Applicant: Protostar Group Ltd., London (GB)

(72) Inventors: Talal Hasan, Muscat (OM); Karan Khimji, Muscat (OM); Ehab Tasfai, Muscat (OM)

(73) Assignee: Protostar Group Ltd., London (GB)

( * ) Notice: Subject to any disclaimer, the term of this patent is extended or adjusted under 35 U.S.C. 154(b) by 0 days.

(21) Appl. No.: 17/705,792

(22) Filed: Mar. 28, 2022

(65) Prior Publication Data

US 2023/0038447 A1 Feb. 9, 2023

Related U.S. Application Data

(60) Provisional application No. 63/230,843, filed on Aug. 9, 2021.

(51) Int. Cl.
*E21B 41/00* (2006.01)
*C01F 5/24* (2006.01)
*C01F 11/18* (2006.01)

(52) U.S. Cl.
CPC .............. *C01F 11/181* (2013.01); *C01F 5/24* (2013.01); *E21B 41/0064* (2013.01)

(58) Field of Classification Search
CPC ....... C01F 11/181; C01F 5/24; E21B 41/0064
See application file for complete search history.

(56) References Cited

U.S. PATENT DOCUMENTS 4,441,555 A * 4/1984 Shu .................... E21B 43/24
166/272.3
4,632,601 A * 12/1986 Kuwada .............. E21B 41/0057
166/305.1

(Continued)

FOREIGN PATENT DOCUMENTS

| CN | 108658104 A | 10/2018 |
| JP | 2007-283279 A | 11/2007 |
| WO | WO 2020/234464 A1 | 11/2020 |

OTHER PUBLICATIONS

Japanese Office Action issued Jun. 27, 2023 in Japanese Patent Application No. 2022-121235 (with English language translation), 4 pages.

*Primary Examiner* — Silvana C Runyan
(74) *Attorney, Agent, or Firm* — Oblon, McClelland, Maier & Neustadt, L.L.P.

(57) ABSTRACT

The present invention provides a system and method to mineralize $CO_2$ into peridotite rocks in a controlled and efficient manner removing carbon permanently from the atmosphere. Carbon dioxide sequestration into peridotite rocks happens naturally by means of natural weathering. However, this process is so slow and might take thousands of years to transform considerable amount of $CO_2$ into carbonate rocks. The present invention, however, shortens the time of mineralization considerably in a controlled and quantifiable manner. This is typically done by injecting $CO_2$ into peridotite rock formation and creating an efficient reaction pathways and conditions for the mineralization reaction to happen and therefore store $CO_2$ by conversion into magnesite ($MgCO_3$) and calcite ($CaCO_3$).

20 Claims, 10 Drawing Sheets

(56) References Cited

U.S. PATENT DOCUMENTS

| | | | |
|---|---|---|---|
| 6,325,147 B1* | 12/2001 | Doerler | E21B 43/20 |
| | | | 166/266 |
| 8,524,152 B2 | 9/2013 | Kelemen et al. | |
| 9,193,594 B2 | 11/2015 | Kelemen et al. | |
| 9,266,061 B2 | 2/2016 | Greenidge et al. | |
| 2004/0200618 A1* | 10/2004 | Piekenbrock | E21B 41/0064 |
| | | | 166/305.1 |
| 2009/0202304 A1* | 8/2009 | Koide | B01D 53/1475 |
| | | | 405/129.2 |
| 2011/0162842 A1* | 7/2011 | Cangemi | B09B 1/00 |
| | | | 166/279 |
| 2014/0186119 A1* | 7/2014 | Dusseault | E21B 41/0064 |
| | | | 405/129.2 |
| 2021/0261451 A1* | 8/2021 | Patton | E21B 43/164 |

* cited by examiner

Time (span of 5 days)

SYSTEM AND METHOD FOR PERMANENT CARBON DIOXIDE SEQUESTRATION USING A RENEWABLE ENERGY SOURCE

CROSS REFERENCE TO RELATED APPLICATION(S)

This application claims the benefit of U.S. Provisional Application Nos. 63/230,843, filed Aug. 9, 2021, which is incorporated by reference as if disclosed herein in its entirety.

FIELD OF THE INVENTION

The present invention is related to a system and method for permanent carbon dioxide (CO2) sequestration using peridotite rock formation. More specifically, the present invention relates to accelerating and controlling natural peridotite carbonation between peridotite and a source of carbon dioxide to be sequestered. The present invention is also related to permanently sequestering carbon dioxide that is captured from industrial emissions, atmospheric air, or that contained in bodies of fluid. The present invention is also related to the use of solar cells and renewable power as energy source to carbon capture plants and carbon storage process equipment.

BACKGROUND OF THE INVENTION

Over the past century, industrial activities, particularly fossil fuel consumption, have caused a dramatic increase of CO2 concentration in the atmosphere. This anthropogenic impact on the global carbon cycle is the main reason for the observed climate change over the past decades. Global climate change has been linked to various other phenomena, including hurricanes, droughts, floods, glacier retreat, and rising sea levels. A recent United Nations Environment Programme report on global warming indicates that 'human influences will continue to change atmospheric composition throughout the 21st century' and carbon dioxide makes the largest contribution out of these human activities. CO2 is released into the atmosphere by the combustion of fossil fuels such as coal, oil or natural gas, and renewable fuels like biomass; by the burning of, for example, forests during land clearance; and from certain industrial and resource extraction processes. As a result, 'emissions of CO2 due to fossil fuel burning are virtually certain to be the dominant influence on the trends in atmospheric CO2 concentration during the 21st century' and 'global average temperatures and sea level are projected to rise'.

As such, large efforts have been made to develop effective carbon capture and storage (CCS) methods that remove CO2 from the atmosphere. Chemical weathering is a slow process that controls atmospheric CO2 concentrations over geological time scales. Several prior art references have proposed accelerating chemical weathering to counter global climate change. The goal of enhanced weathering is to hasten silicate mineral weathering rates to accelerate the removal of CO2 from the atmosphere as dissolved inorganic carbon and/or as carbonate minerals. Because of their relatively rapid dissolution rates, enhanced weathering has focused on mafic and ultramafic rocks.

Because of its high concentration of Mg, tectonically exposed peridotite from the Earth's upper mantle, which is composed largely of the mineral olivine ((Mg, Fe)SiO4), with lesser proportions of pyroxene minerals ((Mg, Fe, Ca)Si2O) and spinel ((Mg, Fe)(Cr, Al)O), and its hydrous alteration product serpentine (Mg3Si2O5(OH)5), have been considered a promising reactant for conversion of atmospheric carbon dioxide to solid carbonate. Natural carbonation of peridotite has been found to be surprisingly rapid compared to other types of rocks. For example, carbonate veins in mantle peridotite in Oman have an average age of approximately 26,000 years and are not 30 to 95 million years old as previously believed. These data and reconnaissance mappings show that approximately 104 to 105 tons per year of atmospheric carbon dioxide are converted to solid carbonate minerals via peridotite weathering in Oman (Kelemen and Matter, 2008). Mantle peridotite is ordinarily more than 6 km below the seafloor and is strongly out of equilibrium with air and water at the Earth's surface. Its exposure along large thrust faults and along tectonic plate boundaries creates a large reservoir of chemical potential energy. Despite the available chemical potential, engineering techniques for carbon sequestration have many challenges. Engineering solutions involve grinding peridotite to a fine powder, purifying carbon dioxide gas, using reaction vessels at elevated pressure, and/or heating reactants to 100 degrees Celsius or more, and this comes at a substantial financial and energy cost.

Various methods have been experimentally evaluated, including direct carbonation of olivine and serpentine powders at elevated temperature, dissolution of serpentine or olivine in hydrochloric acid followed by carbonation of Mg and cations in solution, and reaction of olivine and serpentine with carbonic acid (very similar to natural alteration). Reaction kinetics have been found to be too slow for significant sequestration of carbon dioxide unless the olivine or serpentine reactants are raised to more than 100 degrees Celsius, ground to a fine powder, and/or pre-treated at >600 degrees Celsius to increase reactive surface area. For the most part, because of the requirements for heating and processing, these approaches have been found to be too expensive in financial terms and, more importantly, in energy expenditure—to be commercially viable at present.

DESCRIPTION OF RELATED ART

U.S. Pat. No. 9,193,594B2 discloses methods and systems for enhancing rates of carbonation of peridotite both in situ and ex situ. In some embodiments, the methods and systems include the following: fracturing a volume of peridotite; heating the volume of peridotite; injecting an adjustable flow of carbon dioxide into the volume of peridotite; injecting bicarbonate materials into the volume of peridotite; and forming carbonate with the volume of peridotite and the carbon dioxide in an exothermic reaction thereby generating a self-sustaining heat source, the heat source heating the volume of peridotite.

U.S. Pat. No. 8,524,152B2 discloses methods and systems for enhancing rates of in situ carbonation of peridotite. In some embodiments, the methods and systems include the following: fracturing a volume of peridotite in situ; heating the volume of peridotite in situ; injecting carbon dioxide into the volume of peridotite in situ; and forming carbonate in situ with the volume of peridotite and the carbon dioxide.

U.S. Pat. No. 9,266,061B2 discloses a filter for treating CO2 from a CO2-emitting industrial plant, takes advantage of the fact that peridotite igneous rocks (or material of similar chemical content: basalt, gabbro, dunite, amphibolites, artificially produced Ca, Mg oxides) which are abundant on and close to the Earth's surface, can absorb and contain CO2 gases resultant from industrial activity. This chemical process occurs naturally but has not been utilized to capture high concentrations of CO2 emitted into the atmosphere. Calcium and magnesium oxides of the peridotite react with CO2 to form stable carbonate minerals. The invention enhances and expedites this natural process for the remediation of industrial pollutants such as CO2 from the oil, gas, coal, cement/concrete and like CO2-emitting industries, and provides a resource for materials in construction (concrete), steel, aviation and agricultural and other industries.

JP2007283279A discloses a global warming suppression technology for decomposing, insolubilizing, and/or purifying soil polluted by hazardous substances and pollutants such as waste products, and the like, suppressing pollutants at the levels or lower than environmental quality standards for soil over long periods, and naturally adsorbing and decomposing carbon dioxide in air via its reaction step during treatment. A pollutant treating agent containing noncalcinated peridotite as a principal component is used for separating and/or decomposing pollutants in addition to perform long-term insolubilization by adding and/or mixing light-burned magnesite, light-burned dolomite, fused phosphate, or calcined shell powder according to types of pollutant. Thus, the polluted area is purified. Furthermore, the agent absorbs a large amount of carbon dioxide in air during the step of using the agent, so that the agent has effects as a low-cost and low-environmental-load-type technique for suppressing global warming.

CN108658104A discloses a magnesium sinking technique during a kind of peridotite ore production of magnesia, including processing steps such as ore dressing, grinding, purification and impurity removal, flotation processing, magnesium sinking processing, acid leach removal of impurities, flotation purifying, precipitate separation, to increase the purity and recovery rate of magnesia. The method is disclosed to provide a magnesia purity of up to 99.7% or more, and up to 89.7 94.2%.

PCT/EP2020/064306 discloses a method and a system of abating carbon dioxide (CO2) and/or hydrogen sulfide (H2S) in a geological reservoir. Water is pumped or transferred from a water source to an injection well. The gasses are merged with the water under conditions where the hydraulic pressure of the water is less than the pressure of CO2 and/or H2S gas at the merging point. The water with CO2 and/or H2S gas bubbles is transferred further downwardly at a certain velocity higher than the upward flow velocity of said CO2 and/or H2S gas bubbles ensuring downward movement of gas bubbles resulting in full dissolution of said CO2 and/or H2S in the water due to elevating pressure. The complete dissolution ensures a lowered pH of the water entering a geological (e.g. geothermal) reservoir which is needed to promote mineral reactions leading to CO2 and H2S abatement This abatement may be quantified by dissolving a tracer substance in a predetermined molar ratio to said dissolved CO2 and/or H2S and monitored in a monitoring well.

SUMMARY OF THE INVENTION

The present invention provides an efficient and controlled method for CO2 mineralization into peridotite rocks using renewable energy. Peridotite rocks are known for comprising mostly silicate minerals such as olivine and pyroxene. These types of minerals are active in the presence of solubilized CO2 producing various carbonate rocks. The present invention is based on the idea of injecting solubilized carbon dioxide (Water-CO2 mixture) into peridotite rock formation and creating efficient reaction pathways by manipulating the operation conditions (temperature and pressure) for the mineralization reaction to happen. Consequently, CO2 be converted into magnesite (MgCO3) and calcite (CaCO3) and stored permanently in the rock formation in mineral form.

As previously mentioned, peridotite rocks contain two types of silicate minerals: olivine and pyroxene. Olivine rocks often contain magnesium, oxygen, and silicon. Olivine is the most abundant mineral in the earth's mantle until a depth of 700 km. The composition is usually a combination of SiO4 and Mg2+. Typically, silicon bonds with 4 oxygen molecules forming a pyramid structure so that the charges of cations and anions are balanced, and Mg2+ occupies the empty space between the SiO4 structure. These bonds can be easily triggered to react with carbonic acid. The reaction of olivine with CO2 can be accomplished by the following reaction pathway:

$$MgSiO_4 + 2CO_2 \rightarrow 2MgCO_3 + SiO_2 \qquad [1]$$

It is also proven that the rate of reaction increases significantly by introducing water. Water helps CO2 to be solubilized forming carbonic acid and therefore making the mineralization and ion exchange process far easier and more efficient. Below is the reaction pathway in presence of water:

$$CO_2 + H_2O \rightarrow H_2CO_3 \rightarrow H^+ + HCO_3^- \qquad [2]$$

$$Mg_2SiO_4 + 4H^+ \rightarrow Mg_2{++} + SiO_2 + 2H_2O \qquad [3]$$

$$Mg^{2+} + HCO_3^- \rightarrow MgCO_3 + H^+ \qquad [4]$$

Peridotite contains mainly the mineral's olivine and pyroxene. In the presence of water and CO2, the following reaction occurs:

$$Mg2SiO4 \text{ (olivine)} + CaMgSi2O6 \text{ (pyroxene)} + 2CO2 + 2H2O \rightarrow Mg3Si2O5(OH)4 \text{ (serpentine)} + CaCO3 \text{ (calcite)} + MgCO3 \text{ (magnesite)}$$

The present invention discloses a method that utilizes the above reaction pathways (especially equations 2-6) to convert and/or store CO2 into peridotite rocks. The proposed method also enhances the above reaction rates leading to complete mineralization of total injected CO2 volumes within two to twelve months from injection. The invention also discloses various operating conditions such as temperature, pressure, flowrate (depends on rock permeability), etc. that affect the process efficiency and at which improved sequestration is obtained. Some embodiments of the present invention also cover engineering aspects such as utilizing renewable energy, water looping, and process configuration and design.

The present invention also discloses a method for carbon dioxide sequestration utilizing Pyroxene. Pyroxene is one of the groups in an inosilicate mineral, which is also abundantly found out in peridotite. The general chemical formula for pyroxene is AB(Si)2O6, in which A can be one of the ions like magnesium, aluminum, etc. Most commonly, pyroxene can often be found as CAMg(SiO3)2. Naturally, pyroxene reacts with CO2 according to the following equation:

$$CaMg(SiO_3)_2 + 2CO_2 \rightarrow CaMg(CaCO_3)_2 + 2SiO_2 \qquad [5]$$

However, similar to olivine, water increases the rate of reaction, therefore, in presence of water, below is the reaction pathway for CO2-Pyroxene reaction:

$$CaMgSiO6 + CO2 + H2O \rightarrow Ca2Mg5Si8O22(OH)2 + CaCO3 + SiO2 \qquad [6]$$

BRIEF DESCRIPTION OF THE DRAWINGS

The drawings show embodiments of the disclosed subject matter for the purpose illustrating the invention. However, it should be understood that the present application is not limited to the precise arrangements and instrumentalities shown in the drawings, wherein.

DETAILED DESCRIPTION

Figure 1:
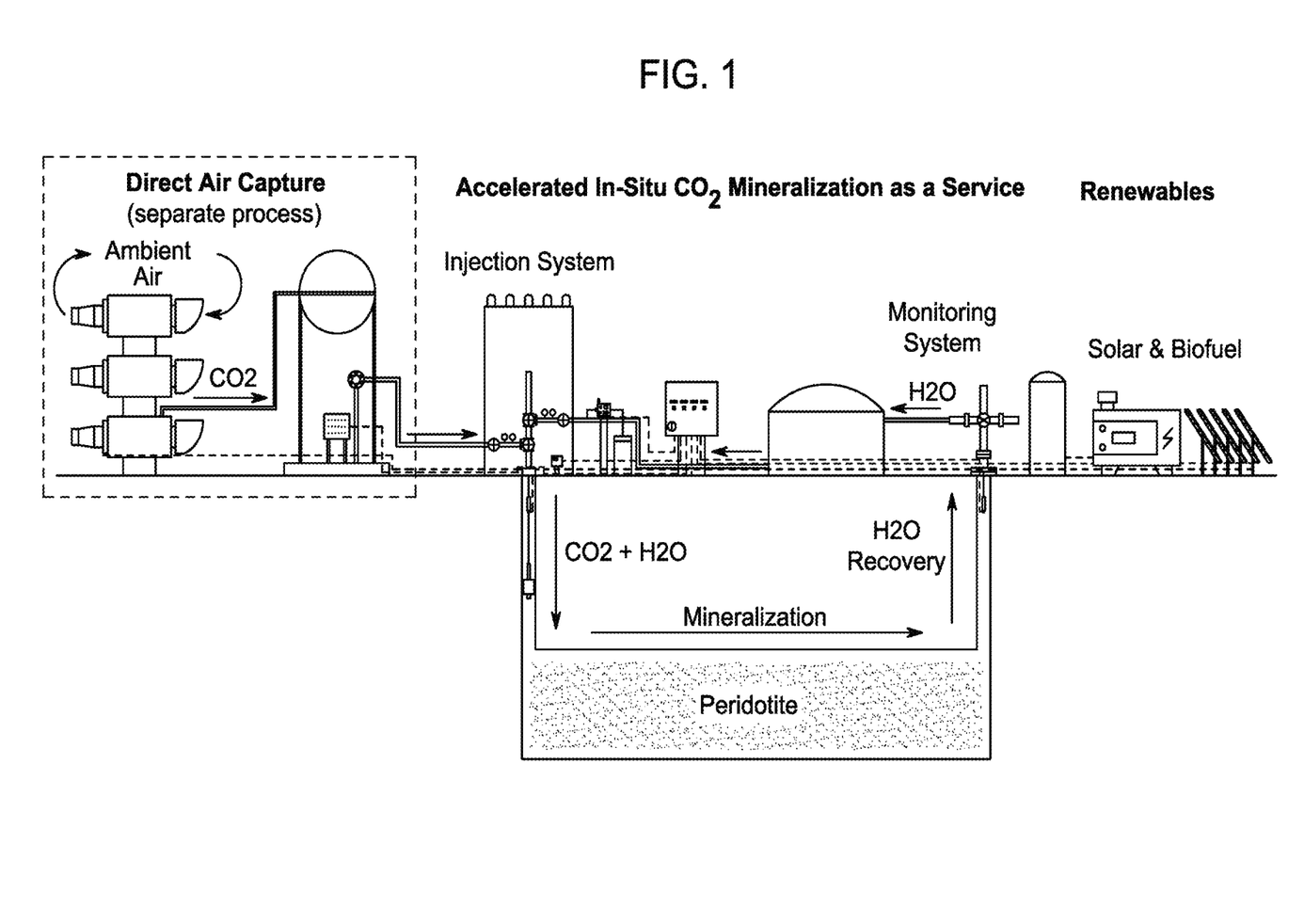
FIG. 1: is a schematic process flow diagram of a system and method according to some embodiments of the disclosed subject matter.

Referring now to FIG. 1, the embodiments described include systems and methods for sequestering carbon dioxide via in situ carbonation of peridotite. The system illustrates Carbon capture module, an injection module, peridotite rock formation, monitoring module and renewable energy storage module to power the process.

Figure 2:
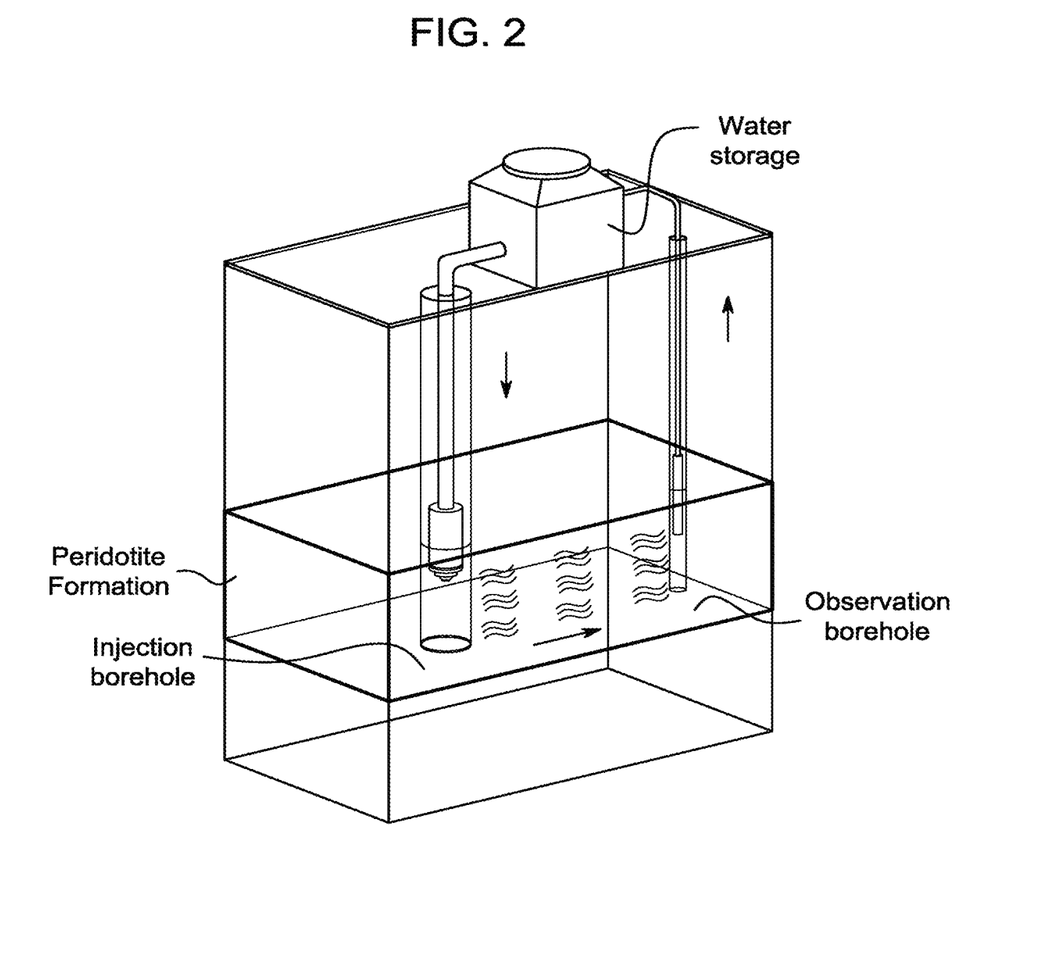
FIG. 2: is schematic process flow diagram of a system and method according to some embodiments of the disclosed subject matter.

Referring to FIG. 2, some embodiments of the disclosed invention include a water looping system having a water storage module, a carbon dioxide injection module, a peridotite formation illustration, and an observation well module for monitoring and controlling carbonation reactions. The process begins by identifying a suitable location with the peridotite layer being at least 0.5 km thick. An injection borehole is drilled into this peridotite layer. Said borehole should be at least 0.5 km deep and up to a maximum of 1.8 km in depth with the ideal depth being between 0.8 to 1.2 km deep. An observation borehole is drilled alongside the injection borehole with hydraulic connection between the two holes. The injection borehole is fitted with an engineered well casing (preferably steel or concrete) which is perforated at the targeted areas for peridotite mineralization in the geological formation (see below for more details). In the continuous injection process water is first pumped from the observation borehole or another source to a buffer storage tank on surface. The buffer tank is fitted to receive water from different sources such as underground water resources, sea water, treated water etc. The water, at ambient temperature, is then pumped at pressure through the injection pipeline to the injection borehole well head by using a set of booster pumps. The formation temperature at 1 km depth is about 60-80° C. Pumping water to this formation will also help controlling the temperature at the site and, consequently, gives greater control over the reaction rate.

A preferable embodiment of the invention utilizes water looping to minimize the consumption, loss and/or use of water during the CO2 fixation process (sequestering). The water mass ratio of the amount of water injected into a subterranean geologic formation (e.g., a rock or peridotite formation) and the amount of water that is recovered at the recovery well (e.g., observation borehole, monitoring borehole or return well) is preferably close to 1:1. Engineering the ingress point at which water injected into the borehole enters into the rock formation and/or engineering of a rock formation that with fissures or fractures functions to improve the overall recovery of water and reduces water loss. Water flow entering the geologic formation from the injection borehole can be directed by careful placement of longitudinal perforations in well tubing present inside the injection borehole or the casing surrounding the borehole in contact with the geologic formation. Preferably, the longitudinal perforations are at least a length of 15 cm, and the density of said perforations along the injection wall tubing, or along the well casing, if present, in the injection well, are related to fluid flow rates at the permeable zones. It is further preferred that said perforations are radially separated with a gap of at least 15 cm in the well casing. Preferably the perforations are disposed within a zone of injection that corresponds to a shortest distance direct line from the borehole wall of the injection borehole to the borehole wall of the return well. Perforations in the borehole are disposed in the casing of the borehole in only a single hemisphere of the borehole, e.g., the hemisphere encompassing the shortest distance direct borehole-borehole line. Disposing the perforations in this way functions to reduce unwanted or unintended flow of water in a direction away from the recovery well. Alignment of the perforations with fractures and fissures that are in hydraulic communication with the recovery well may also be favored.

The longitudinal perforations preferably occur at depths in the injection borehole that are within the target zone of the geological formation proximal to an upper boundary. Additional perforations at progressively deeper borehole depths, but preferably in the same hemisphere, may extend downwardly into the borehole proximal to a maximum depth of the peridotite-containing rock formation. The recovery borehole preferably has a depth that is at least the same as the maximum depth of the perforations of the injection borehole. In other embodiments the recovery borehole has a depth that is deeper than the deepest perforation of the injection borehole such that water flowing by gravity will pool or collect at the deeper portions of the recovery borehole and thereby minimize water loss. Preferably the recovery borehole depth is no greater than the maximum depth of the rock formation that comprises mainly peridotite.

Total dissolved solids of the water may decrease as the water passes through the rock formation. In this manner the recovery borehole collects water that is of greater purity the water (CO2 rich fluid-mixture) initially injected into the injection borehole. Saline water, brackish water and/or seawater can have a reduced total solids content after flowing through the injection borehole, through the rock formation and recovery borehole.

Water looping is likewise utilized in above ground handling and treatment of water, e.g., during processing of water collected in the recovery borehole prior to injection into the injection borehole. Preferably at least a majority of the water injected into the injection borehole is recycled or reused for later injection of additional CO2 into the injection borehole. Preferably, all of the water obtained from the recovery borehole is used in the injection borehole after the addition of further CO2. Water looping in this manner minimizes the need to pre-purify water prior to injecting into the rock formation and maximizes the reuse and recycle of the water.

The recovery borehole is preferably an uncased well so that water may more easily enter and collect in the recovering borehole. In other embodiments the recovery borehole is partially cased with at least a major portion of the borehole length that passes through the target zone remaining uncased. Partial casing of the recovery borehole reduces loss of water in strata above and/or below the target zone that may be porous and/or otherwise hydraulically communicate with other underground rock formations that do not permit recovery of water.

In a preferred embodiment of the invention the CO2 rich fluid-mixture is injected into the geologic formation through the injection borehole at an ambient temperature preferably 25-30° C. ±15° C., preferably ±10° C., more preferably ±5° C. As recognized by one of skill in the art, cooler temperatures are capable of dissolving greater amounts of CO2. This aspect of the invention is particularly well-suited for evaporative cooling of the return fluid obtained from the recovery, observation or monitoring well.

Fixation of the CO2 in the CO2 rich fluid-mixture injected into the geologic formation is, in a preferable embodiment, essentially complete. For example, a CO2 rich fluid-mixture injected into the injection borehole forms a return fluid collected at the return well (observation or monitoring borehole) having an amount of dissolved CO2 that is less than 0.1 wt %, preferably less than 0.05 wt %, more preferably less than 0.01% by weight based on the total weight of the return fluid and the CO2. The return fluid may be completely free of CO2.

In a still further embodiment of the invention the geologic formation is first subject to pretreatment with water or an aqueous solution before the CO2 rich fluid-mixture is injected therein. Pretreatment with water or aqueous solution can enhance initial absorption and fixation of CO2. Treatment with an aqueous solution such as an aqueous acidic solution may enhance CO2 absorption of fixation by forming voids and crevices within the geologic formation thereby providing enhanced fluid flow through the formation and/or otherwise activating the peridotite formation for reaction with CO2.

Prior mechanical fracturing of the geologic formation is not required. Preferably the CO2 rich fluid-mixture is injected into the geologic formation at pressures substantially less than those necessary in order to mechanically fracture the formation.

CO2 is dissolved in fluid on surface through a gas dissolution module into the pressurized water stream between the booster pumps and the injection well head. Artificial conservative tracer(s) are used to trace the injected CO2-saturate fluid within the storage reservoir utilizing the monitoring/observation boreholes. Molar ratio of tracers to CO2 are kept constant at the injection well, whereas changes of this ratio in the observation borehole indicates CO2 abatement via reaction with peridotite. The CO2 gas is dissolved once it mixes with the pressurized water stream, where it is carried to the target injection zone. The gas pressure in the pressurized water stream is set to be below or close to the hydrostatic pressure at the target injection depth. The CO2 rich fluid-mixture is then injected through the injection borehole well head. The injection well head is connected through a non-corrosive pipe to a packer system that is installed just above the target injection zone. The packer system hydraulically isolates the column for injection of CO2 rich fluid-mixture into the peridotite rock formation. The injected CO2 rich fluid-mixture is dispersed through the annulus within the peridotite formation where the dissolved CO2 reacts in-situ with the peridotite rocks. The dispersion of the CO2-rich fluid mixture happens via perforated well casing which targets a specific pre-determined permeable layer of the peridotite. Monitoring of both the injected CO2 rich fluid-mixture on surface and the hydraulic pressures at the injection interval is continuously logged for analysis using sensors and a data acquisition system. Samples from the injection borehole below the packed off interval are collected through a membrane system to the surface for continuous dissolved CO2 analysis. The injection well head is fitted with CO2 gas detection devices to monitor any potential leakages of the gas on the surface. This whole process is advantageously powered by a hybrid-renewable system to keep a carbon footprint low and maximize the net amount of CO2 eliminated (see section 2 below).

The CO2 rich fluid-mixture is preferably injected into the borehole within the target zone by delivery through a steel or polymer tubing string. In this embodiment contact between the borehole wall and/or casing with the CO2 rich fluid-mixture is minimized except for at a location where the borehole is perforated within the target zone of peridotite. The point at which the CO2 rich fluid-mixture is released from the tubing string into the borehole can be determined by using packers at different depths or different positions within the borehole. Preferably packers are set both upstream and downstream of the injection point(s) within the injection borehole at which the CO2 rich fluid-mixture is released from the tubing string into the borehole and through perforations in the borehole casing into the rock formation. Preferably a packer is set above the maximum depth of the target formation and below the minimum depth of the target formation to limit the release of the CO2 rich fluid-mixture into the portion of the borehole which directly corresponds with and is encompassed by a peridotite rock formation.

In a preferred embodiment of the invention the return fluid formed when the CO2 rich fluid-mixture (e.g., CO2 saturated water) passes through the geologic formation (e.g., peridotite reservoir) is subject to cooling after return to the surface. In order to make good use of renewable resources a portion of the return water is used in an evaporative cooling process. For example, when returning to the surface the return fluid may flow through a manifold system in which the return fluid is divided into at least two portions. A main portion is piped to another location, for example, to a storage tank or directly to the well injection point for further mixing with CO2 and later injection into the injection borehole. The second, typically smaller, portion is transferred to an evaporative cooling apparatus and evaporated. A return fluid pipe used for transferring the main portion of the return fluid may disposed in a second pipe of larger diameter forming an annulus space between the outer surface of the return fluid pipe and the inner surface of the second pipe. The second portion of the return water may then be sprayed or passed into the annulus in the presence of a stream of gas in which the second portion of the return fluid evaporates thereby providing cooling effect to cool the fluid in the return fluid pipe. Preferably, the gas flow used in the evaporative cooling is CO2 which may subsequently be transferred to a CO2 storage facility and/or the well injection point for injection into the geological formation. The gas stream exiting the annulus includes evaporated water and mainly carbon dioxide gas.

Injection of the CO2 rich fluid-mixture into the injection well may be under conditions permitting effervescence of CO2 from the CO2 rich fluid-mixture. The formation of bubbles in the geologic formation may permit enhanced absorption and/or fixation through effects that include, for example, disruption of water flow as a two-phase mixture and collisions of CO2 bubbles with features of the geologic formation surface.

The hybrid-renewable system preferably includes a plurality of photovoltaic (PV) cells to generate electricity from sunlight. Electrical storage facilities are typically included. PV panels are preferably mounted over the injection system and over storage tanks. Especially with respect to mounting above the injection system, electrical energy obtained from the PV cells may be used directly thereby avoiding the complexities and expense of long electrical transfer lines.

Aspects of the invention include portability of injection and renewable energy components. Portability, especially as it relates to the injection system, is especially advantageous for relocation of the injection equipment and energy generating equipment to new locations of geologic material. As a geologic formation of peridotite becomes reacted/saturated with CO2, the efficiency of further CO2 fixation decreases. It is then advantageous to seal the return fluid well (for example by cementing) and relocate injection of the CO2 rich fluid-mixture to an injection point located differently than an initial well.

Figure 3:
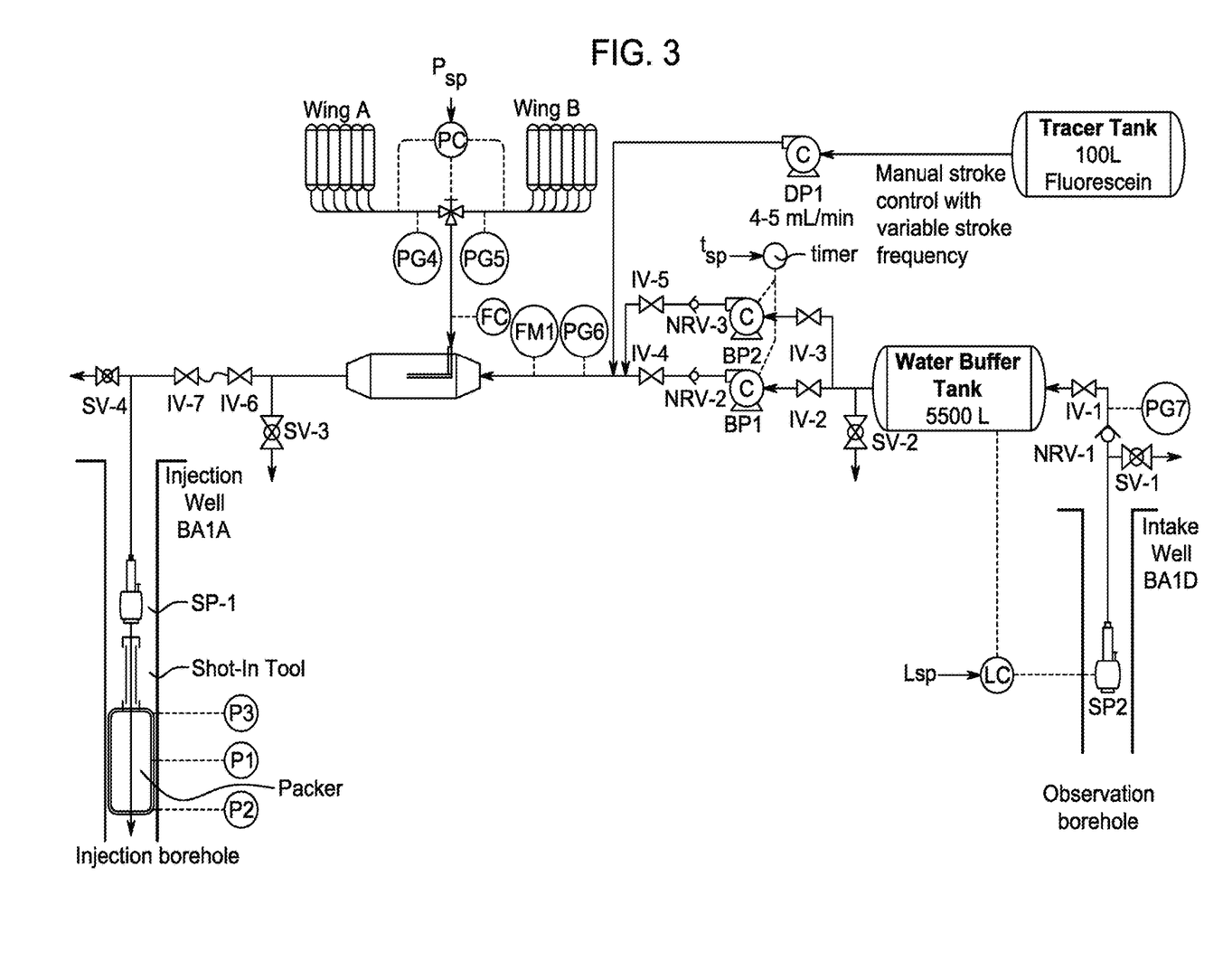
FIG. 3: is schematic process flow diagram of a system and method according to some embodiments of the disclosed subject matter.

Referring to FIGS. 2 and 3, some embodiments of the disclosed subject matter include a continuous injection method and other embodiments show an overview of the CO2 injection system. Submersible pump (SP2) is installed in the observation borehole at depth and is used to pump ground water into an on-surface storage tank. SP2 flow rates and pressures preferably match the permeability of the subsurface formation. The on-surface storage tank is equipped with sensors that automate the operation of the SP2 and acts as a buffer between the observation and injection boreholes. The on-surface storage tank is also fitted with coupling connections to receive water from different other sources. A set of Booster pumps (BP) are used in parallel to inject water from the on-surface storage tank at pressure to the injection well. The flow rates of the fluid-mixture are adapted to the permeability of the target injection zone at the injection borehole. A permeability test is carried out to determine these rates at the injection borehole prior to injecting CO2 rich fluid-mixture. Dosing pump (DP) is used to regulate a tracer fluid. The tracer is injected into the water stream at pressure, in the pipe section between the BPs and the injection well head, using a set of DPs. The dosing rate is regulated throughout the injection process. The tracer fluid is used to trace the injected CO2 rich fluid-mixture in the subsurface using observation boreholes. A gas dissolution module is installed on a flanged pipe section, before the injection well head. CO2 gas is injected at pressure into the water stream. CO2 gas injection pressure is regulated by a mass flow controller device that is connected to a gas manifold. The gas manifold controls the supply of CO2 gas from the CO2 storage tanks at a regulated pressure level. The gas dissolution module is designed to maximize gas transfer efficiencies as well as buffer capacities within the injection pipe column and to release CO2 gas bubbles at <50 um to maximize bubbles surface area for solubility and to reduce the buoyancy effect. The CO2 rich fluid-mixture is injected into the subsurface through the Injection Well Head on the injection borehole. The injection well head holds the string assembly that is suspended on a supported mechanical system on the surface. The string assembly is composed of: (1) Non-corrosive fluid pipes that connect the injection well head on surface to the packer system and acts as the injection column for the CO2 rich fluid-mixture; (2) Submersible pump (SP1) placed on the injection borehole and connected on the string assembly used to pump back the injected CO2 rich fluid-mixture any at given point during the injection process; (3) Shut-In-Tool (SIT) that is used to isolate the injection interval once the CO2 rich fluid-mixture is injected into peridotite formation which acts as a safety measure to prevent any undissolved CO2 gas bubbles from rising back to the surface during any maintenance operations; and (4) Packer System (PS) consists of a water or gas inflation packer that is used to pack off the interval at the target injection zones. The packer is equipped with various sensors to monitor hydraulic pressures of the column above and below the packed off interval as well as the packer pressure. The PS is also set-up with other sensors for live monitoring of the injection zone interval. The interval is packed off at a differential to the column hydrostatic pressure ensuring a proper seal is maintained once hydraulic pressure below the packed off interval begins to increase.

In addition to conventional tracers, confirmation that CO2 injected into the geological formation is absorbed and fixed can be determining by measuring the CO2/fluid ratio at the well injection point in comparison to the CO2/fluid ratio in the return fluid at a surface return site. The CO2 injected into the geologic formation can be modified to include an amount of nucleotide-labeled material (for example CO2 labeled with 17O or CO2 labeled with 14C) and compared with a corresponding amount (concentration) in the return fluid.

An fluid recovery well for the return fluid can be located at a distance from the CO2 injection well such that the distance the CO2 rich fluid mixture traverses through the geologic formation is sufficient to absorb and/or fixate substantially all of CO2 in the CO2 rich fluid-mixture. This distance may vary depending on the location of the injection well, the structure of the geologic formation and the availability of water for injecting the CO2 rich fluid-mixture into the geologic formation. A distance of 0.1-10 km, preferably 0.2-5 km, 0.5-1 km or 0.7-0.9 km can be used.

Figure 4:
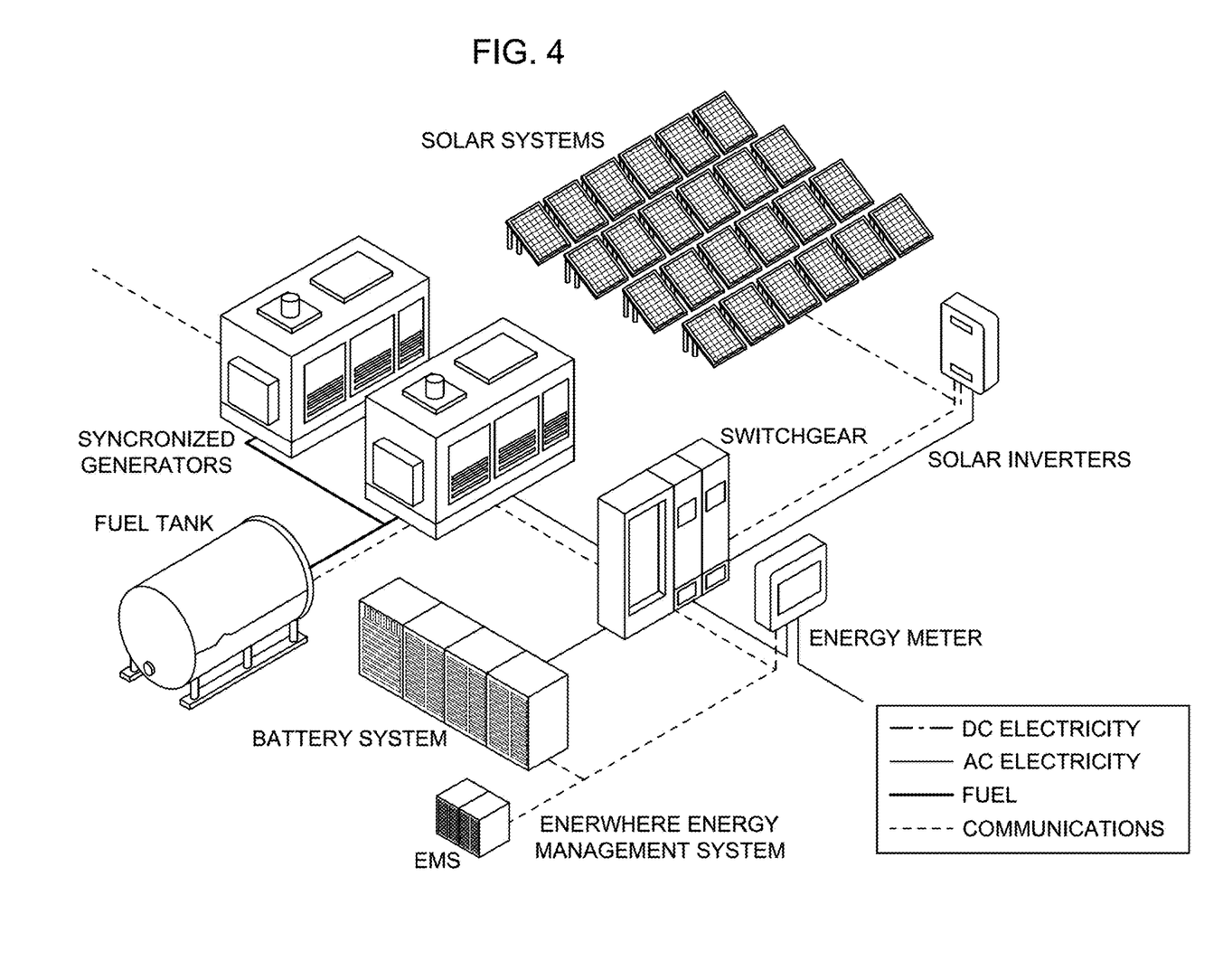
FIG. 4: is a diagram of a system of renewable energy module according to some embodiments of the disclosed subject matter.
Figure 5:
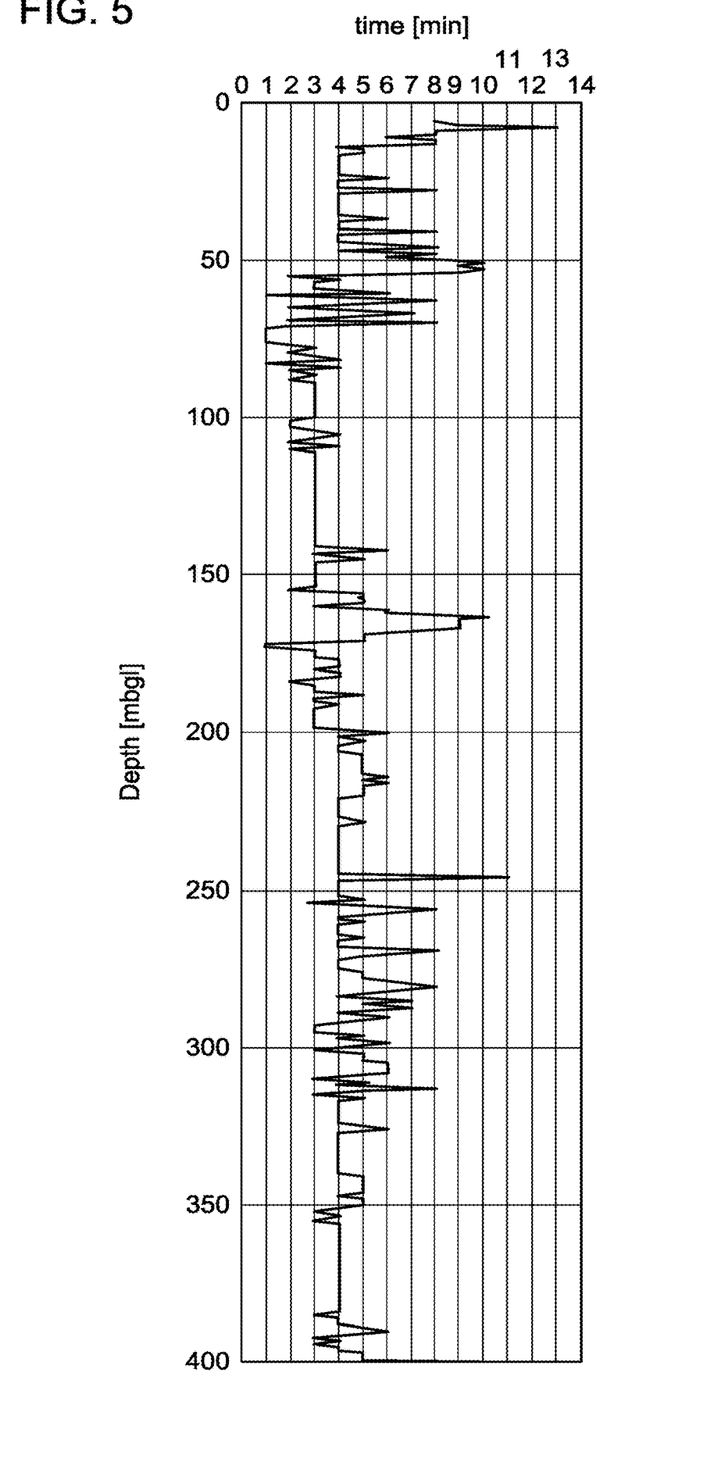
FIG. 5: is a diagram of a well log data that reports level of porosity of rock formation.
Figure 6:
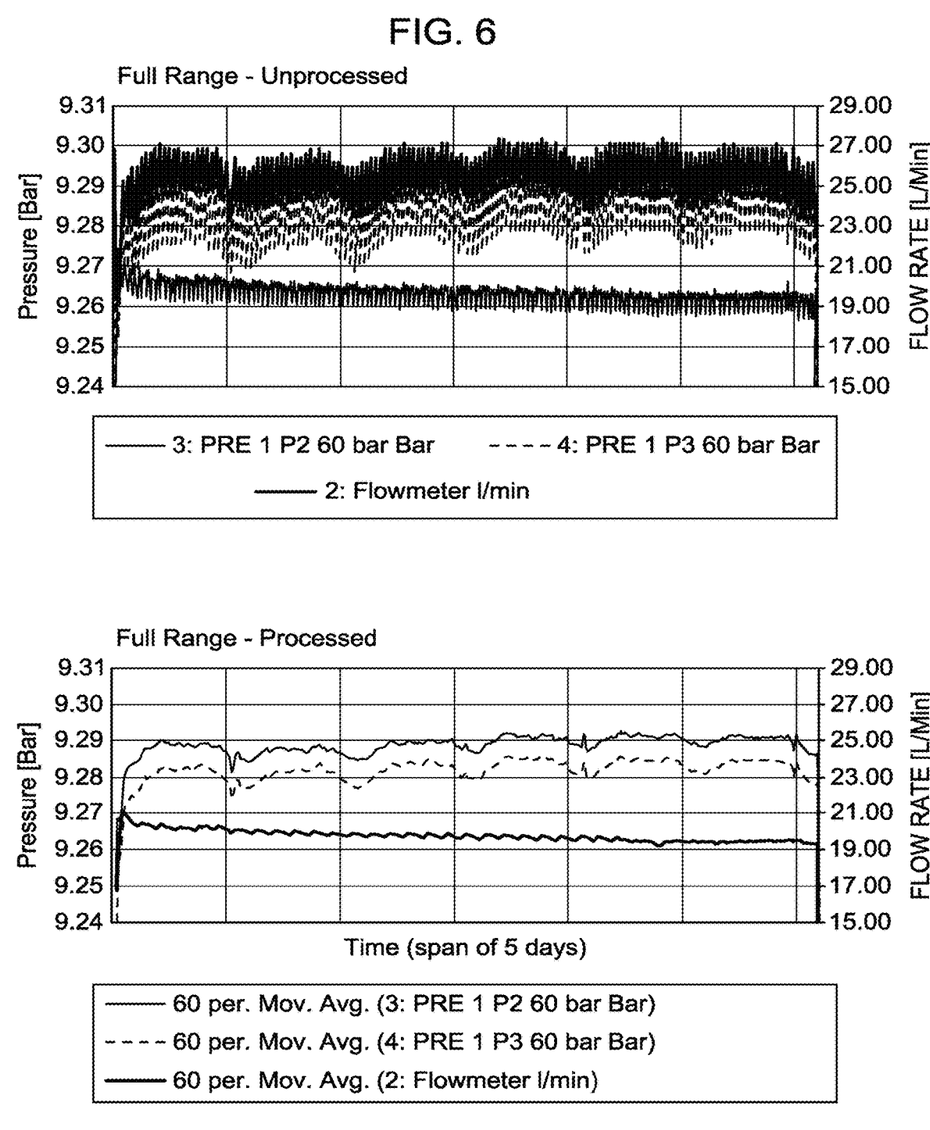
FIG. 6: is diagram of a system and method according to some embodiments of the disclosed subject matter.
Figure 7:
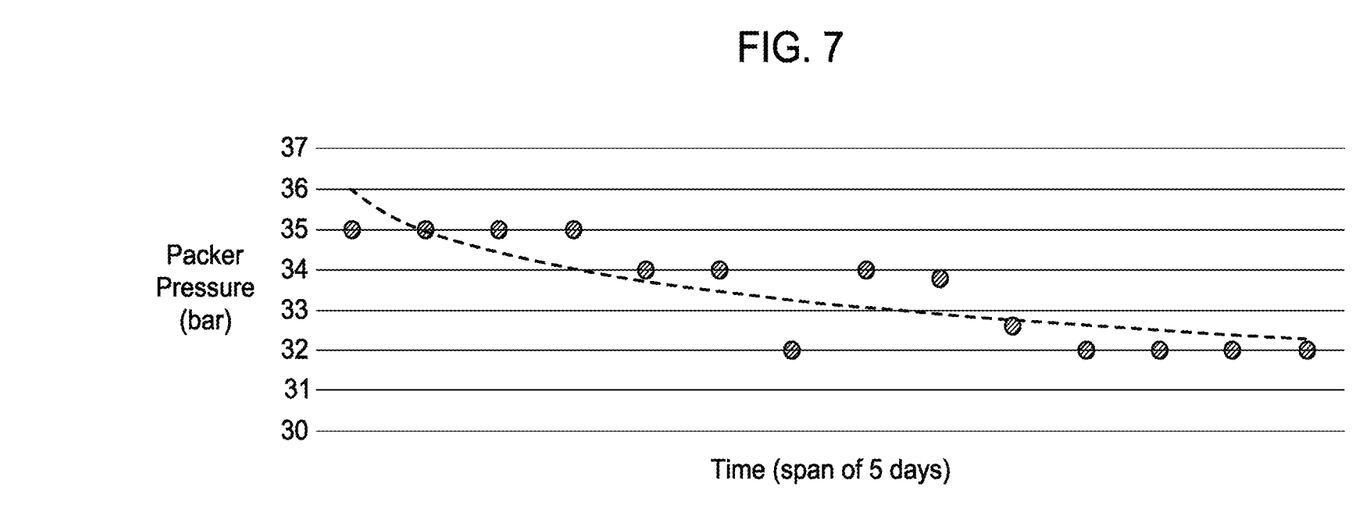
FIG. 7: is diagram of a system and method according to some embodiments of the disclosed subject matter.
Figure 8:
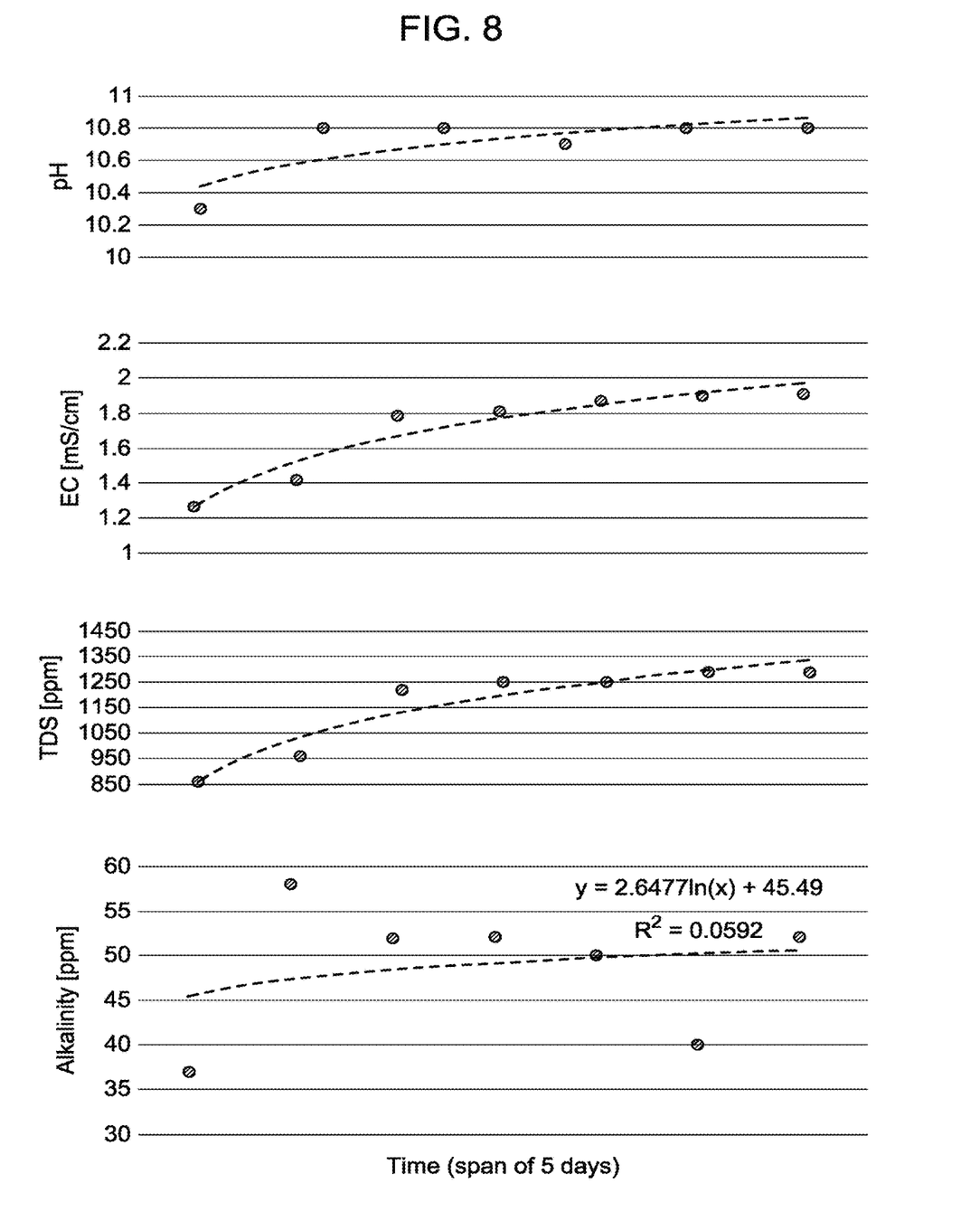
FIG. 8: is diagram of a system and method according to some embodiments of the disclosed subject matter.
Figure 9:
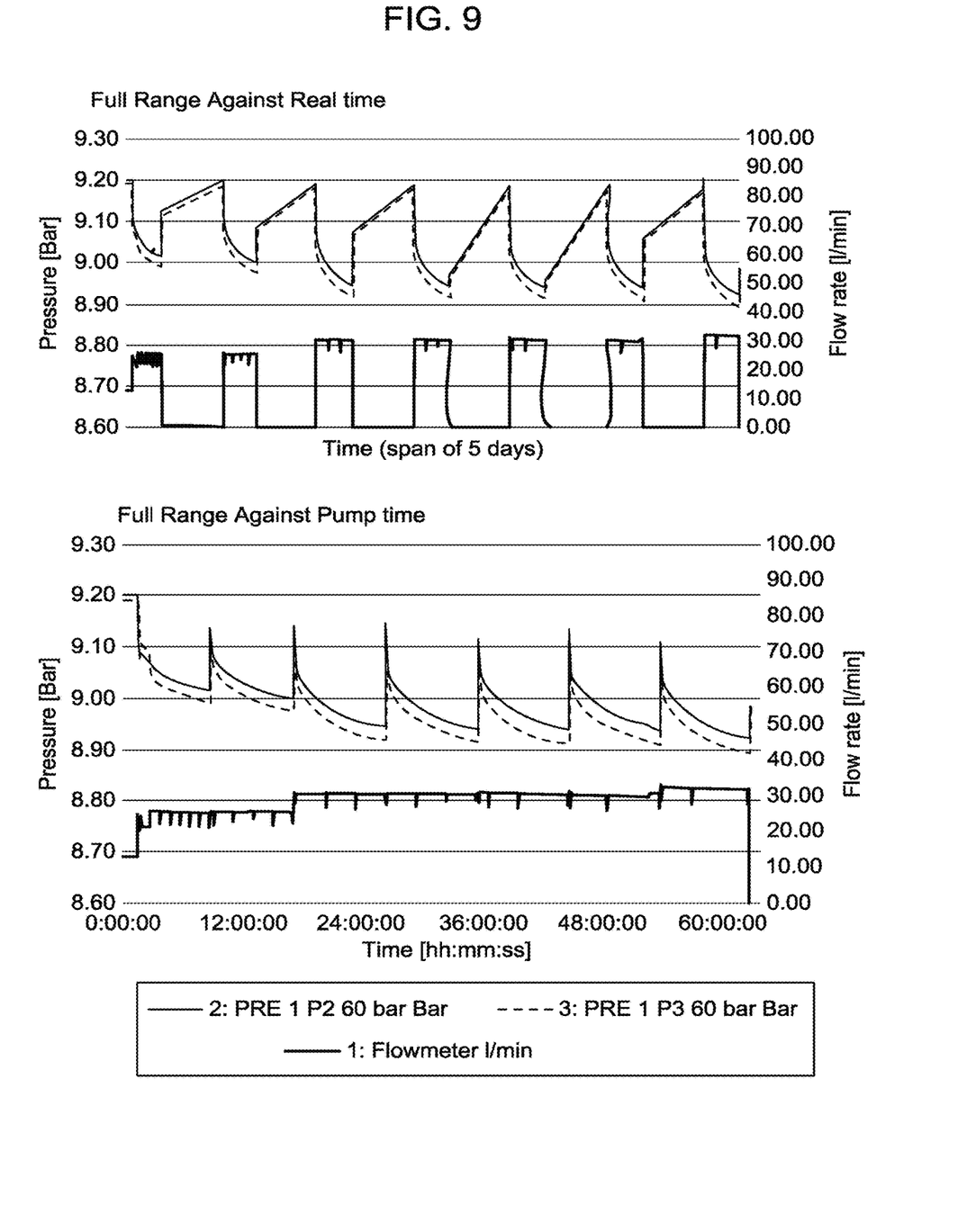
FIG. 9: is diagram of a system and method according to some embodiments of the disclosed subject matter.
Figure 10:
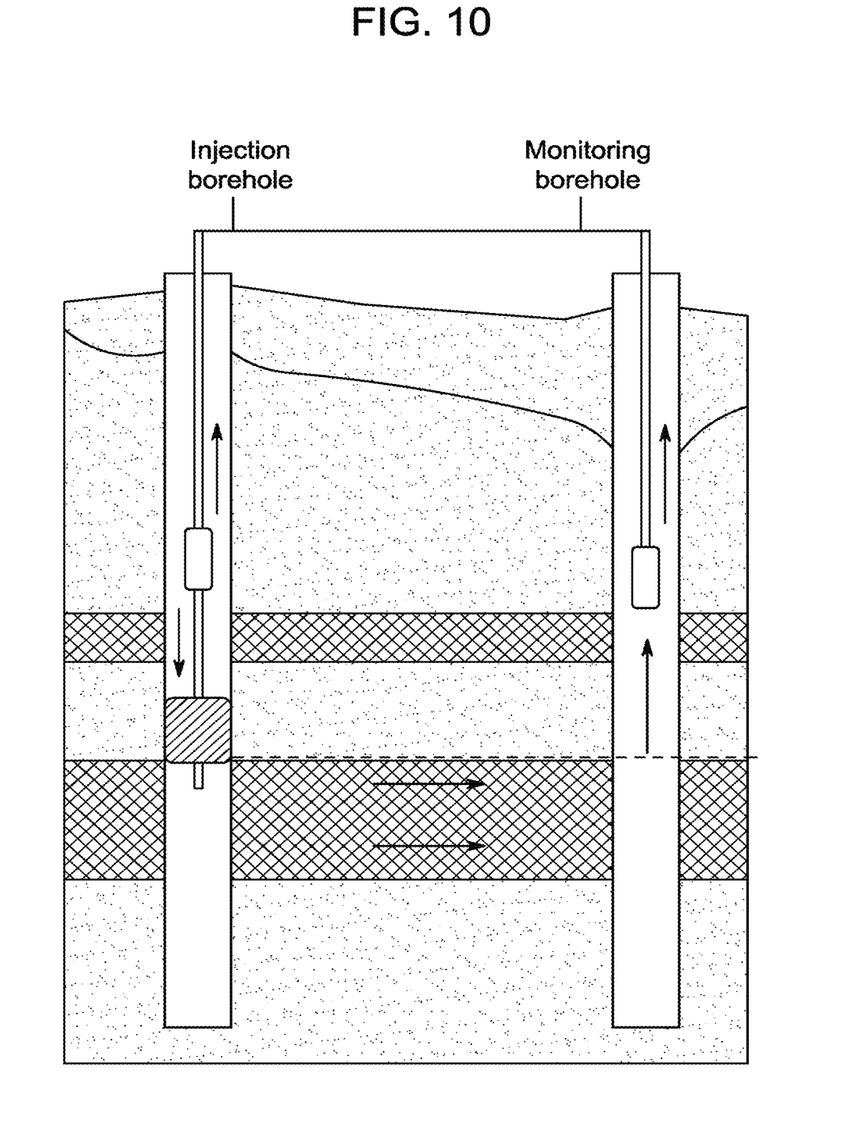
FIG. 10: is diagram of a system and method according to some embodiments of the disclosed subject matter.

Referring to FIG. 4, some embodiments of the disclosed subject matter include a renewable energy system that consists of for example, a solar cell module, an energy storage module, wind turbines, and a biofuel module. The renewable energy system works on such a way that during daytime, solar energy is used to supply the loads to all injection systems on the ground. Excess renewable energy is stored to be used for improved system performance and for operation during night-time. During night-time operation, energy stored is used for supplying the required loads. Based on site consumption, the energy stored would be utilized to supply the night loads throughout the entire night period along with renewable energy sources that can operate at night (Eg; wind turbines and biofuel generators). There is no loss in power while transitioning from solar/off-grid operation to energy storage, the stored energy will instantly take over supply and smoothly transition to energy storage operation only. The hybrid controller will be responsible for communication among the inverters, storage, biofuel Generators and the overall transfer of power within the system Another preferred embodiment of the present invention is the injection borehole development. This involves increasing wellbore diameter from 16.5 cm to 25 cm for the full depth of the borehole and permanent installation of non-corrosive casing, wherein said well casing is about 18 to 23 cm in diameter, ideally 7-inch (about 18 cm) in diameter, with slotted sections or screen in the injection zone, for example longitudinal perforations of a length of at least 15 cm, wherein said perforations are separated with a longitudinal gap of at least 30 cm. Drilling Rate of Penetration (ROP) can be used to interpret rock properties. A slower rate of penetration indicates a requirement for higher fracture stress by the drill bit to break the rock. For rock types that are known to be homogenous this information will serve as an indication for the level of porosity at different depths. Porosity reduces the fracture stress of bulk rock type and therefore increased ROP is indicative to higher porosity. Referring to FIG. 6, this confirms that faster ROP above 100 mbgl (meters below ground level) is indicative of a higher level of porosity and therefore a higher water to rock ratio. Below 100 mbgl the porosity is lower and therefore the water to rock ratio is expected to be lower. However, the plot shows distinct regions below 100 mbgl where the ROP increases which indicate the presence of intervals with higher porosity.

In another preferred embodiment of the present invention, downhole injection assembly system is described. A packer tool is installed to isolate the injection interval from the remaining part of the borehole. This allows for installation of pressure monitoring devices above and below the packer tool. A shut-in tool is installed to isolate the injection interval after injection to ensure no upward drift of injected fluid to the top intervals. The submersible pump is used to draw water from the isolated injection interval and for sampling purposes. Downhole injection piping and equipment are pressure rated to withstand injection pressures required. Well head installed constitutes of two ports: 1) Incoming injection fluid and 2) outgoing sampling port. It is noteworthy to mention that a check should carried out for any blockages and remove any existing blockages for the complete depth of the open borehole. Submersible Intake pump is used in the observation well. A submersible pump is used to draw water from the observation well to be used for injection purposes in the injection borehole. The submersible pump is placed at least 60 mbgl to draw water from above the injection interval in injection borehole. This is done to minimize interference in the event of existing subsurface connectivity between the two wellbores. The submersible pump is sized on the following flow basis: provide a flow rate of a minimum of 0.1 L/s and a minimum of 8640 L/day under the recommended operating schedule. The submersible pump is sized on the following pressure basis: placement depth is a minimum of 60 mbgl; pumping head must be sufficient to deliver water to surface at ease. Submersible pumps cannot operate continuously for extended period. Therefore, the observation well water will be temporarily stored water in a buffer tank to counteract the intermittent nature of submersible pumps.

In another preferred embodiment of the present invention a water buffer tank is described. The water buffer tanks will hold water from observation wells or from another source to counteract pumping intermittency, flow intermittency, stabilize pressure and for additional process control and operational reasons. Sizing of the buffer tank is dependent on the selection of the submersible pump and is made on the following basis: 1) the tank holds sufficient capacity to allow the submersible pump to deliver the daily required volumes following the recommended hours of operation schedule; and 2) the tank should hold sufficient capacity to allow for continuous and uninterrupted draw of at least 0.1 L/s for injection. The buffer tank also plays a critical role of dampening pressure fluctuation caused by natural changes in water levels in the observation borehole and will therefore allow for a stable pressure supply by the injection pumps. The injection pump/s are selected for continuous and uninterrupted operation. The sizing of the pumps are made on the following basis: 1) flow rate set at a minimum of 0.1 L/s; 2) sufficient overpressure to cover hydrostatic head at the injection interval, major and minor head losses due to the system assembly, and account for pressure build up to allow flow through the injection zone is done through energy balance equation used to calculate head loss in system and Darcy's law used to determine flow into the injection zone by assuming linear cylindrical outward flow; and 3) provide a pressure high enough to ensure solubility of dissolved CO2 on surface at steady state flow conditions. Dosing pump will be used to inject set volume (at least 5 mL/min) of liquid conservative tracers into along with the injection fluid. Dosing is done inline after the injection pumps. Due to the dynamic changes in the subsurface pressure conditions after the start of injection flow rate is expected to change over time to reflect the change in conditions. The water flowmeter will record changes in the injected fluid flow rate over injection time to monitor the system behavior with respect to subsurface pressure and to allow for accurate accounting of total injected volumes and to assist with dynamic data interpretation. Electromagnetic flow meter is selected for its uniform behavior, responsive reading time, uninterruption to flow and due to the homogenous nature of the injected fluid that allows for consistent magnetic behavior and therefore consistent flow reading accuracy. The flow meter is calibrated specifically for the project application to ensure the accuracy of the meter for the expected flow conditions.

Another preferred embodiment of the present invention is a CO2 injection system development. The Automatic CO2 gas switchover manifold is used to stabilize and regulate the pressure from CO2 tanks. CO2 tank pressure gradually decreases as the contained gas is depleted and due to the sensitive thermodynamic behavior of gas temperature swings between day and night has a significant impact on tank supply pressure. Further the expansion of the gas through various valves and through the pipes also associate with temperature changes and consequently pressure changes. To allow for accurate and controlled pressure delivery the manifold regulates the delivery pressure from tanks to a selected setpoint. The manifold also ensures uninterrupted CO2 supply by operating one wing and keeping the second wing on standby. Once the delivery pressure from the primary wing is not capable of meeting the target setpoint the manifold automatically switches to the secondary standby wing. Gas flow is difficult to regulate due to the impact of temperature upstream and downstream pressure on the flow rate. The gas flow controller will adjust the flow to account for all gas flow fluctuation to maintain a stable flow rate of a minimum of 1.3 g/s. Gas Dissolution Module is also used. A gas dissolution system is used to maximize the gas liquid contact surface area to minimize gas dissolution time and to ensure complete dissolution of CO2 in the injected water. This system is placed after the injection pump as higher pressures promote higher gas solubility. The system is designed to dissolve gas with a bubble diameter less than 100 um, preferably less than 50 um, and is specifically designed and tuned for the project application accounting for both water and gas flow rates and pressures. The design of the system also accounts for the gas pressure drop across the system to balance with the maximum delivery pressure available from the manifold and additional pressure drops in the gas delivery system, to ensure flow into the high-pressure water line. The housing of the system is designed to accommodate all components with minimal interruption to water flow, provides easy internal access for servicing purposes and allows for slower flow velocity so that the dissolution residence time matches the fluid residence time in the unit. Preferably said gas dissolution module is configured to inject at a gas flow rate of a minimum of 15 liters per minute, a gas pressure of a minimum 8 bar, and a minimum temperature of 25° C.

In another preferred embodiment include a monitoring system. Monitoring includes a complete water quality testing, pH, total dissolved solids (TDS), electrical conductivity (EC), temperature, Oxidation Reduction Potential (ORP) and other physical properties. A sample from borehole water has been collected after drilling activity for complete water quality testing by an independent laboratory. Submersible pump placed at a minimum of 60 mbgl used to collect water for pH, EC, TDS, Temperature and ORP on site. Additional submersible pump is placed at a minimum of 60 mbgl used to collect samples to test for Cation, Anion, Alkalinity, and dissolved CO2. In addition, monitoring system also includes the injected conservative tracers to monitor the change of the molar ratio of CO2 to tracers, which is kept constant in the injection well. Changes in this ratio will indicate CO2-water-rock reactions and thus CO2 abatement. In addition, utilizing natural tracers such as stable carbon, strontium, magnesium and calcium isotopes, it is possible to determine the reactivity of the peridotite system to mineralize the injected CO2.

In another preferred embodiment of the present invention, the fluid flowpath between the injected borehole and the observation borehole are natural fractures that extend in other directions than upward or downward or in case of limiting natural fractures, a fracture network that has been induced through permeability enhancement.

EXAMPLE

In this embodiment, shown in FIG. 11, CO2 is fully dissolved on the surface via a propriety system at a predefined CO2 to water ratio. A conservative tracer (e.g. sodium fluorescein) is metered into the water injection stream at specific rate that accounts for dilution in the subsurface using a dosing pump. The CO2 saturated fluid is injected via the non-corrosive pipe to the hydraulically isolated target injection interval. A monitoring borehole that is hydraulically connected to the injection borehole via a natural fracture network in the peridotite reservoir, is utilized for estimating the CO2 mineralization capacity of said reservoir rock. A monitoring equipment is used to monitor the degree of CO2 abatement via peridotite-water reactions, utilizing the molar ratio of CO2 to said conservative tracer. Using the measured concentration of said conservative tracer in the injected fluid and the fluid retrieved in the monitoring borehole allows calculating dilution of the injected fluid with ambient reservoir groundwater via dispersion. Changes in the conservative tracer to CO2 molar ratio from the injection borehole (which is fixed for said injection) to the observation borehole indicate CO2-peridotite reactions and thus a loss of CO2 along the said flowpath. CO2 mineralization can be quantified by monitoring the dissolved CO2 content in the injected fluid and in the observation borehole via said membrane system. Decreased dissolved CO2 concentration in the observation borehole fluids compared to the initial concentration in the injection borehole would clearly indicate the amount of CO2 sequestered.

We claim:

1. A method of carbon dioxide sequestration by in situ mineralization of carbon dioxide in an underground geological formation, wherein the geological formation comprises mainly peridotite, comprising:
    dissolving an amount of carbon dioxide into water in a gas dissolution module on or above the surface of the earth to form a carbon dioxide and water mixture;
    injecting the carbon dioxide and water mixture into said geological formation through an injection borehole well head of an injection well, wherein the injection borehole well head is connected to tubing extending into the geological formation;
    wherein a packer is connected to said tubing and disposed in the injection well to hydraulically isolate the carbon dioxide and water mixture below a minimum depth of the geological formation and above a maximum depth of the geological formation;
    wherein said tubing has a plurality of longitudinal perforations at a depth of 0.5 to 1.8 km in the geological formation;
    and
    reacting the majority of the carbon dioxide in said carbon dioxide and water mixture with said geological formation to sequester the carbon dioxide in the geological formation by forming calcites and magnesites, wherein water displaced from the geological formation by the injected carbon dioxide and water mixture is recycled via a return well that is at a distance from the injection well.

2. The method of carbon dioxide sequestration of claim 1, wherein said longitudinal perforations have a length of at least 15 cm.

3. The method of carbon dioxide sequestration of claim 2, wherein said perforations are radially separated with a gap of at least 15 cm.

4. The method of carbon dioxide sequestration of claim 1, powered at least in part by a renewable energy source selected from the group consisting of solar energy, wind energy, biofuel energy, hydro energy, geothermal energy and other green energy sources.

5. The method of carbon dioxide sequestration of claim 1, further comprising:
    recycling water from the carbon dioxide and water mixture injected into said underground geological formation via said return well to a storage tank.

6. The method of carbon dioxide sequestration of claim 5, wherein most of the water of the carbon dioxide and water mixture flows from a high pressure zone in the injection well to a low pressure zone and most of the volume of the water in the carbon dioxide and water mixture injected into the injection well is recycled back through the observation well.

7. The method of claim 1, powered at least in part by a renewable energy source that is a hybrid energy source selected from the group consisting of
    a solar energy module;
    a renewable energy storage module;
    wind turbines;
    hydroelectricity;
    biofuel generator; and
    other renewable energy sources;
    and combinations thereof.

8. The method of claim 7, wherein said renewable energy source comprises:
    solar photovoltaic panels;
    solar inverters;
    synchronized biofuel generators;
    an energy storage module; and
    control panels and switch gears.

9. The method of claim 7, wherein said renewable energy source provides power to on-surface and subsurface modules.

10. The method of claim 7, wherein said gas dissolution module is configured to inject at a gas flow rate of a minimum of 15 liters per minute, a gas pressure of a minimum of 8 bar, and a minimum temperature of 25° C.

11. The method of claim 10, wherein said gas dissolution module is configured to inject gas bubbles of a size less than 100 micrometers into a water flow in said tubing, wherein said tubing is non-corrosive.

12. The method of claim 1, wherein the injection well includes a cemented casing.

13. The method of claim 1, wherein the injection well includes a cemented casing, wherein the carbon dioxide and water mixture is injected into the geologic formation at pressures substantially less than those necessary in order to mechanically fracture the geological formation.

14. The method of claim 1, wherein the reaction of the carbon dioxide in said carbon dioxide and water mixture with said geological formation is such that the amount of carbon dioxide in the water recycled at the return well is less than 0.01% by weight based on the total weight of the water recycled at the return well and the carbon dioxide.

15. The method of claim 1, wherein the reaction of the carbon dioxide in said carbon dioxide and water mixture with said geological formation is substantially complete.

16. The method of claim 1, wherein the water mass ratio of water injected into the geological formation and the water recovered at the return well is about 1:1.

17. A method of carbon dioxide sequestration by in situ mineralization of carbon dioxide in an underground geological formation, wherein the geological formation comprises mainly peridotite, comprising:
dissolving an amount of carbon dioxide into water in a gas dissolution module on or above the surface of the earth to form a carbon dioxide and water mixture;
injecting the carbon dioxide and water mixture into said geological formation through an injection borehole well head of an injection well connected to tubing extending into the geological formation;
wherein a packer is connected to said tubing and disposed in the injection well to hydraulically isolate the injected carbon dioxide and water mixture below a minimum depth of the geological formation and above a maximum depth of the geological formation;
wherein said tubing has a plurality of longitudinal perforations at a depth of 0.5 to 1.8 km in the geological formation;
reacting the majority of the carbon dioxide in said carbon dioxide and water mixture with said geological formation to sequester the carbon dioxide in the geological formation by forming calcites and magnesites; and
recycling water displaced by the injected carbon dioxide and water mixture from said geological formation via a return well that is at a distance from the injection well;
wherein said method is powered at least in part by a renewable energy source.

18. The method of claim 17, wherein the reaction of the carbon dioxide in said carbon dioxide and water mixture with said geological formation is such that the amount of carbon dioxide in the water recycled at the return well is less than 0.01% by weight based on the total weight of the water recycled at the return well and the carbon dioxide.

19. The method of claim 17, wherein the reaction of the carbon dioxide in said carbon dioxide and water mixture with said geological formation is substantially complete.

20. The method of claim 17, wherein the water mass ratio of water injected into the geological formation and the water recovered at the return well is about 1:1.

* * * * *